(12) United States Patent
Doebbeler et al.

(10) Patent No.: US 10,145,612 B2
(45) Date of Patent: Dec. 4, 2018

(54) FLICKER REDUCTION IN ELECTRIC ARC FURNACES BY MEANS OF FLICKER PREDICTION FROM THE STATE DETERMINATION IN THE INITIAL PHASE OF THE SMELTING PROCESS

(71) Applicant: SIEMENS AKTIENGESELLSCHAFT, Munich (DE)

(72) Inventors: Arno Doebbeler, Herzogenaurach (DE); Ralf Engels, Heroldsbach (DE); Thomas Matschullat, Eckental (DE); Wolfgang Meusel, Herzogenaurach (DE); Detlef Rieger, Baldham (DE)

(73) Assignee: Siemens Aktiengesellschaft, Munich (DE)

( * ) Notice: Subject to any disclaimer, the term of this patent is extended or adjusted under 35 U.S.C. 154(b) by 654 days.

(21) Appl. No.: 14/430,982

(22) PCT Filed: Jun. 25, 2013

(86) PCT No.: PCT/EP2013/063207
§ 371 (c)(1),
(2) Date: Mar. 25, 2015

(87) PCT Pub. No.: WO2014/048595
PCT Pub. Date: Apr. 3, 2014

(65) Prior Publication Data
US 2015/0226484 A1    Aug. 13, 2015

(30) Foreign Application Priority Data
Sep. 25, 2012   (DE) .................. 10 2012 217 232

(51) Int. Cl.
*H05B 7/148*   (2006.01)
*F27B 3/28*   (2006.01)
(Continued)

(52) U.S. Cl.
CPC .............. *F27B 3/28* (2013.01); *C21C 5/5211* (2013.01); *F27B 3/085* (2013.01); *F27D 11/08* (2013.01);
(Continued)

(58) Field of Classification Search
CPC ....... H05B 7/144; H05B 7/148; Y02P 10/256; Y02P 10/259; F27D 19/00;
(Continued)

(56) References Cited

U.S. PATENT DOCUMENTS 5,155,740 A * 10/1992 Ao .................... C21C 5/5229
323/210
5,438,588 A * 8/1995 Wanner ............. C21C 5/5229
373/102
(Continued)

FOREIGN PATENT DOCUMENTS

| CN | 1605143 A | 4/2005 |
|---|---|---|
| DE | 2742221 A1 | 3/1979 |

(Continued)

OTHER PUBLICATIONS

Development of a Model for Predicting Flicker From Electric Arc Furnaces—by Manchur and Erven, 1992, listed in IDS of Mar. 25, 2015.*

(Continued)

*Primary Examiner* — Hung D Nguyen
(74) *Attorney, Agent, or Firm* — Laurence Greenberg; Werner Stemer; Ralph Locher

(57) ABSTRACT

Flicker values to be expected may be determined and achieve a high probability from suitable state and operating variables which are acquired during the first minutes in the initial smelting phase. In this way, flicker can effectively be (Continued)

reduced and kept below predefined limiting values. This is in particular suitable during steel production using electric arc furnaces.

13 Claims, 3 Drawing Sheets

(51) Int. Cl.
*C21C 5/52* (2006.01)
*F27B 3/08* (2006.01)
*F27D 11/08* (2006.01)
*F27D 19/00* (2006.01)

(52) U.S. Cl.
CPC ...... *F27D 19/00* (2013.01); *C21C 2005/5288* (2013.01); *F27D 2019/0037* (2013.01); *Y02P 10/216* (2015.11)

(58) Field of Classification Search
CPC .. F27D 2019/0037; F27D 11/08; F27B 3/085; F27B 3/28; C21C 5/5211; C21C 2005/5288
USPC ........ 373/44, 45, 46, 49, 60, 63, 66, 78, 79, 373/81, 88, 102, 104, 105, 109; 75/386, 75/10.12, 10.13, 375; 266/78, 80, 81, 90
See application file for complete search history.

(56) References Cited

U.S. PATENT DOCUMENTS

| | | | | |
|---|---|---|---|---|
| 5,818,208 A * | 10/1998 | Othman | ............... | H02J 3/1842 323/207 |
| 5,991,327 A * | 11/1999 | Kojori | .................. | C21C 5/5211 373/104 |
| 6,573,691 B2 | 6/2003 | Ma et al. | | |
| 2003/0076075 A1 * | 4/2003 | Ma | ....................... | H02J 3/1864 323/209 |
| 2006/0050758 A1 * | 3/2006 | Sedighy | .................... | F27B 3/28 373/102 |
| 2008/0208496 A1 * | 8/2008 | Habath | .............. | G01R 19/2513 702/77 |
| 2010/0219567 A1 * | 9/2010 | Imanari | .................... | C21D 1/26 266/44 |
| 2012/0134384 A1 * | 5/2012 | Miani | .................. | C21C 5/5211 373/73 |

FOREIGN PATENT DOCUMENTS

| | | |
|---|---|---|
| DE | 69937873 T3 | 11/2008 |
| EP | 0896067 A1 | 2/1999 |
| JP | H09229560 A | 9/1997 |
| JP | 2008202867 A | 9/2008 |
| KZ | 26187 B | 9/2012 |
| RU | 2268556 C1 | 1/2006 |

OTHER PUBLICATIONS

Employing stochastic models for prediction of arc furnace reactive power to improve compensator performance—by Samet and Golshan, 2008, listed in IDS of Mar. 25, 2015.*

Samet, H. et al., "Employing stochastic models for prediction of arc furnace reactive power to improve compensator performance", IET Generation, Transmission & Distribution, Jan. 21, 2008, pp. 505-515, vol. 2. No. 4.

Manchur, G., et al., "Development of a Model for Predicting Flicker from Electric Arc Furnaces", IEEE Transactions on Power Delivery, 1992, pp. 416-426, vol. 7, No. 1.

Farina, J., et al., "A Methodology for Determining the Frequency Response of Electrodes in Arc Furnaces for Silicon Metal Production", Conference Record of the 2003 IEEE Industry Applications Conference, 38th IAS Annual Meeting, Salt Lake City, Utah, US, Oct. 12-16, 2003, pp. 105-110.

Weng Li-Min et al: "Suppression Research of Voltage Fluctuation & Operation Characteristics of Electric Arc Furnace", China Academic Journal Electric Publishing House, 33, 2004—English abstract.

* cited by examiner

FLICKER REDUCTION IN ELECTRIC ARC FURNACES BY MEANS OF FLICKER PREDICTION FROM THE STATE DETERMINATION IN THE INITIAL PHASE OF THE SMELTING PROCESS

Flicker reduction in electric arc furnaces by means of flicker prediction from the state determination in the initial phase of the smelting process

BACKGROUND OF THE INVENTION

Field of the Invention:

Scrap metal is predominantly melted in electric arc furnaces for steel production. Above all electric arc furnaces which use 100% scrap metal generate network disturbances, for which the affected power supply company frequently charges with contractual penalties if specific limiting values are exceeded. Therefore, compensation systems (SVC—static VAR compensator) are installed in steel mills, to reduce network disturbances such as flicker and harmonics, in order to maintain predefined limiting values. However, such SVC systems only react afterwards to the already generated network disturbance from the harmonics or flicker generated in the electric arc furnace during the scrap metal melting, and cannot always maintain the prescribed limiting values, in particular if the electric arc furnaces are operated on weak supply networks.

Various conventional remedying measures are known for avoiding excessively high flicker values. For example, a low flicker melting operation is proposed, in which an appropriately selected scrap metal mix having an ultralow KSt value, auxiliary reactants in the furnace loop and a control-technology parameterization are used for the arc stabilization. In this case, the KSt value is the value which describes in particular the type, weight, and density of the scrap metal. According to UIE, this value is between 48 and 85. For example, a furnace transformer restrictor can be used as an auxiliary reactant in the furnace loop. In addition, so-called compensation systems (SVC) have conventionally been used for decades, with which the generated flicker can be reduced by approximately half. Conventional SVC systems having voltage source inverters based on IGBTs (insulated gate bipolar transistor) are also known, which are used if the flicker reduction is to be more than doubled.

However, these conventional measures are linked either to high investment and operating costs or to losses in the production. Not only do the scrap metal composition and quality have influence on network disturbances, the regulation performance of the electrode regulation and the mode of operation in the scrap metal melting phase can also have noticeable effects on the generation of network disturbances. The recognition of scrap metal movements and scrap metal collapse is thus substantially left to the operating personnel. A conventional electrode regulation can only react afterwards to these events here. Only conventional approaches are known, which engage afterwards in the steel production process. Accordingly, a conventional compensation system can only react to the states during the melting and the predefined limiting values are then often exceeded.

BRIEF SUMMARY OF THE INVENTION

It is an object to provide a method and a device for flicker reduction in steel production by means of electric arc furnaces such that network disturbances, in particular flicker, are effectively reduced and limiting values are maintained with a high probability. In addition, the best possible melting performance or the greatest possible introduction of power in the furnaces are to be brought about.

The object is achieved by a method according to the main claim and a device according to the further independent claim.

According to a first aspect, a method is proposed for flicker reduction in steel production by means of an electric arc furnace, wherein a flicker database is provided by means of a storage unit, in which overall time curves of instantaneous flicker are stored in dependence on state variables and operating variables; a time curve of instantaneous flicker is measured by means of a capture device during an initial melting phase of the steel production and associated state variables and operating variables are determined; the measured time curve of instantaneous flicker during the melting phase is compared to the stored time curves of the melting phases of the overall curves of the flicker database with consideration of the state variables and operating variables by means of a computer unit; an overall time curve having maximum correspondence of instantaneous flicker and also state variables and operating variables is selected as a predicted overall curve of the flicker by means of the computer unit, and a preventive dynamic adaptation of the further control of the steel production process upon comparison of the predicted overall curve to predefined limiting values for flicker is executed by means of a control unit.

According to a second aspect, a device is proposed for flicker reduction in steel production by means of an electric arc furnace, wherein a storage unit provides a flicker database, in which overall time curves of instantaneous flicker are stored in dependence on state variables and operating variables; a capture device measures a time curve of instantaneous flicker during an initial melting phase of the steel production and determines associated state variables and operating variables; a computer unit compares the measured time curve of instantaneous flicker during the melting phase to the stored time curves of the melting phases of the overall curves of the flicker database with consideration of the state variables and operating variables; the computer unit selects an overall time curve having maximum correspondence of instantaneous flicker and also state variables and operating variables as a predicted overall curve of the flicker; a control unit preventively dynamically adapts the further control of the steel production process upon comparison of the predicted overall curve to predefined limiting values for flicker.

Fundamentally, the term "control" selected here alternatively or cumulatively includes the term "regulation".

According to the present invention, an approach for predictive, automated intervention is proposed. Predictive flicker determination is proposed. The term "preventive" means in particular "predictive, problem avoiding" here.

By means of data-processing analysis of a present operating situation in an initial phase of a melting process in comparison to a flicker knowledge database, the future development of the flicker can advantageously be concluded. In this manner, an optimized melting operating mode may be dynamically set, which enables the greatest possible performance or the greatest possible performance capacity and limiting of the flicker to predefined limiting values at the same time. An implementation can be performed in particular within the scope of a novel, intelligent, predictive, and state-oriented electrode regulation and melting monitoring, so that further advantages can be implemented in the electric arc furnace.

It has been recognized according to the invention that the flicker values to be expected may be determined with relatively high reliability from suitable state variables and operating variables, which are determined during the first minutes in a melting phase. During this time, the electric arcs drill through the scrap metal. This phase is therefore referred to as the drilling phase. The instantaneous flicker arising in this case is symptomatic to a certain degree for the melt and can be used together with other measured state variables for a flicker prediction.

Further advantageous embodiments are claimed in conjunction with the dependent claims.

According to one advantageous embodiment, in each case dimension and slope of instantaneous flicker can be stored and measured.

According to a further advantageous embodiment, state variables and operating variables can be a basket number, a steel quality, electrical parameters, and/or scrap metal parameters.

According to a further advantageous embodiment, a respective initial melting phase can have in each case a drilling phase and a collapse phase for scrap metal introduced in each case by means of a basket, wherein the measurement and the determination can take place in each case during the first 100 to 200 seconds after the melting of the introduced scrap metal.

According to a further advantageous embodiment, the predicted flicker values can be less than the predefined limiting values, so that the control unit can control the steel production process to achieve maximum capacity with optimum energy introduction.

According to a further advantageous embodiment, predicted flicker values can be greater than the predefined limiting values, so that the control unit can control the steel production process in a manner adapted for flicker reduction during the times of the flicker values which are greater than predicted.

According to a further advantageous embodiment, the control unit can take into consideration the auxiliary information that the flicker values which are greater than predicted preferentially occur for each basket at the end of a drilling phase and/or during a collapse phase.

According to a further advantageous embodiment, the control unit can increase the inductance of the electric arc furnace by means of higher throttle steps or switching in a throttle during the times of the flicker values which are greater than predicted.

According to a further advantageous embodiment, the control unit can set an electrode regulation for short arcs having greater currents during the times of the flicker values which are greater than predicted.

According to a further advantageous embodiment, the control unit can apply periodic movements to the electric arcs during the time of the flicker values which are greater than predicted.

According to a further advantageous embodiment, the control unit can re-parameterize an already existing compensation system in a dynamically adapted manner during the time of the flicker values which are greater than predicted.

According to a further advantageous embodiment, the predicted flicker values can lie in a border region to the predefined limiting values, so that the control unit can switch the steel production process in a manner controlled between maximum capacity and flicker reduction.

According to a further advantageous embodiment, the control unit can control the steel production process in a manner adapted for flicker reduction during the times at the end of a drilling phase for each basket and during a collapse phase.

BRIEF DESCRIPTION OF THE SEVERAL VIEWS OF THE DRAWING

The invention will be described in greater detail on the basis of exemplary embodiments in conjunction with the figures. In the figures.

DESCRIPTION OF THE INVENTION

Figure 1:
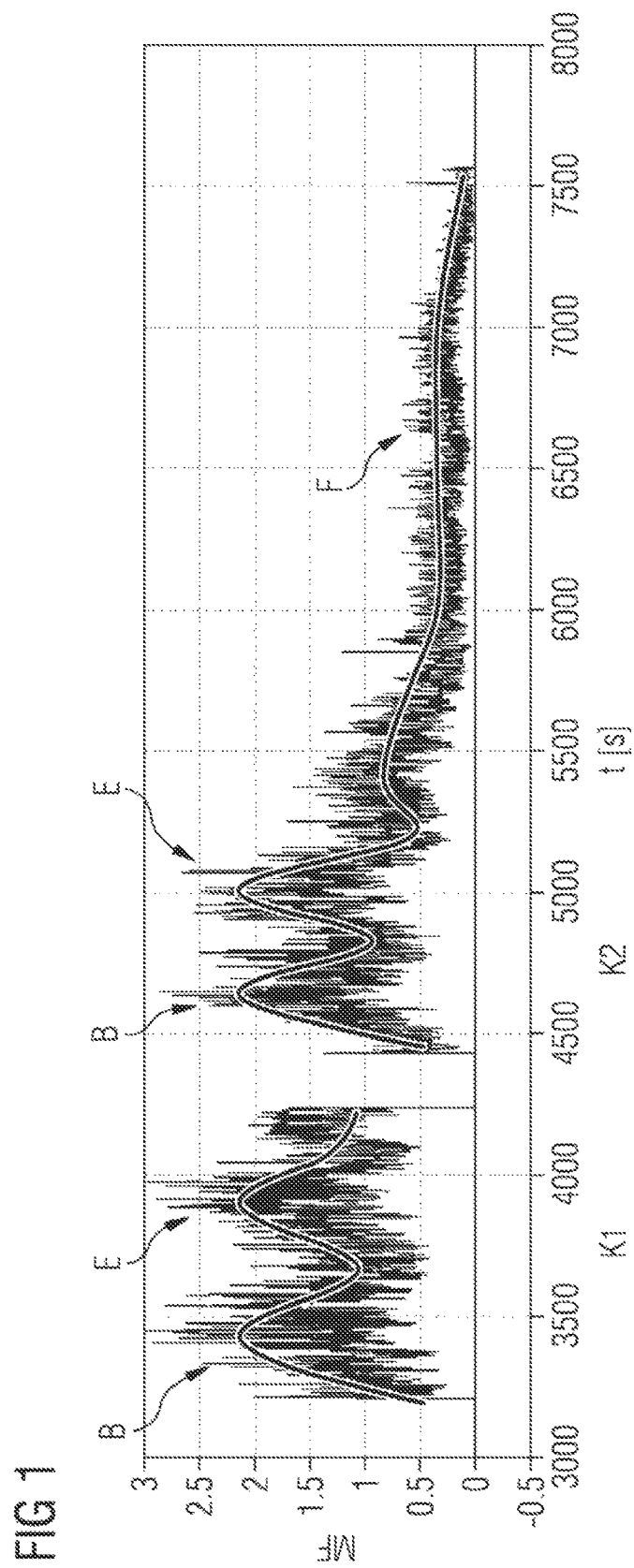
FIG. 1 shows a first exemplary embodiment of an instantaneous flicker curve.

FIG. 1 shows an exemplary embodiment of an instantaneous flicker curve. FIG. 1 shows a typical curve of an instantaneous flicker of a melt. The time t in seconds s is plotted on the abscissa. The ordinate specifies numeric values for the instantaneous flicker. The scrap metal of a first basket is melted between 3200 seconds and 4200 seconds. This initial melting phase is divided into a drilling phase B and a collapse phase E. Within the time window from 4500 seconds to 5200 seconds, scrap metal located in a second basket is melted in the electric arc furnace. The melting phase is also divided into the drilling phase B and the collapse phase E for this additional step. For example, a third basket having scrap metal can influence the instantaneous flicker curve. According to FIG. 1, a liquid phase F follows the second collapse phase E. MF indicates instantaneous flicker. FIG. 1 shows a typical curve of the instantaneous flicker during a complete batch. The instantaneous flicker was determined for each of the three phases on the high-voltage side using a standard flicker meter and describes the short-term occurrence of the network flicker. In the case of melting of the first basket K1 during the drilling phase B, a strong increase of the instantaneous flicker is observed, then a characteristic drop and a second increase during the so-called collapse phase E, during which scrap metal which is not yet melted slips down or also collapses from the furnace walls into the molten zones under the electrodes. This process results in high flicker values. In the case of the second basket K2, this behavior is repeated, wherein the so-called flat bath phase F then follows, during which the scrap metal is substantially melted and the electric arcs burn stably on the melt. This results in very low flicker values. The curve and the height of the flicker can have very different profiles depending on the scrap metal used and the melting mode of operation, however. This is shown in FIGS. 2 and 3.

Figure 2:
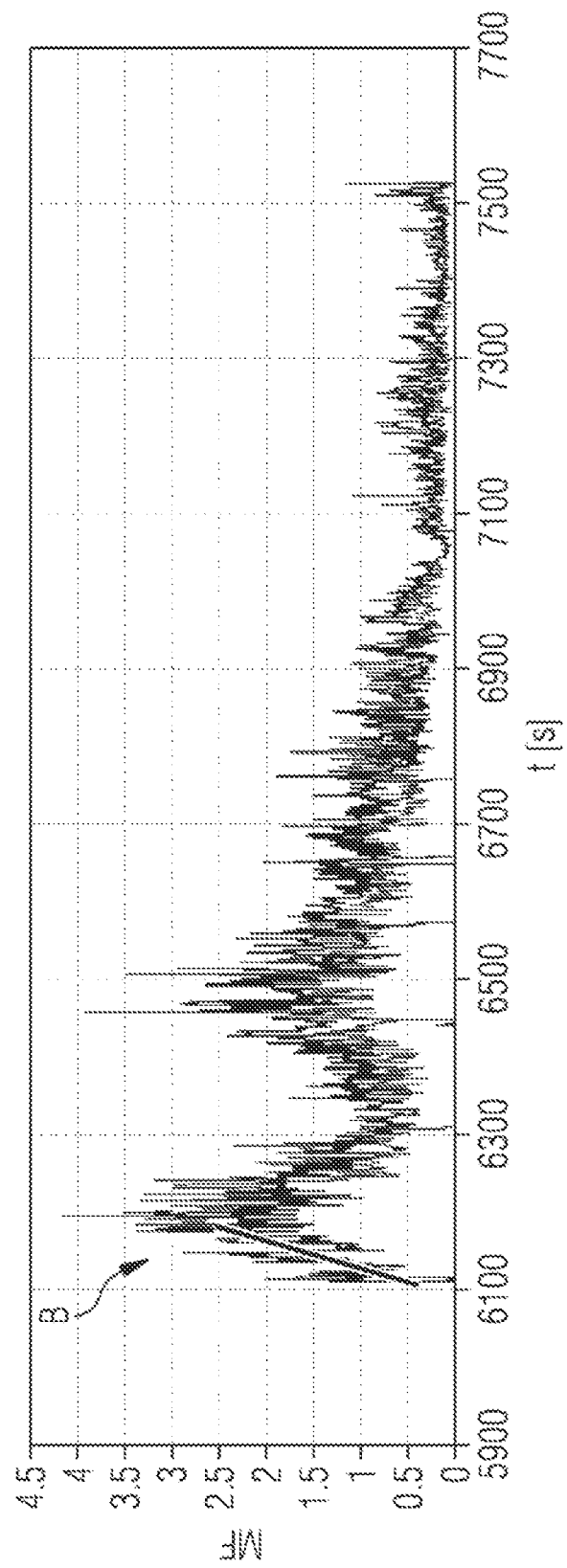
FIG. 2 shows a second exemplary embodiment of an instantaneous flicker curve.
Figure 3:
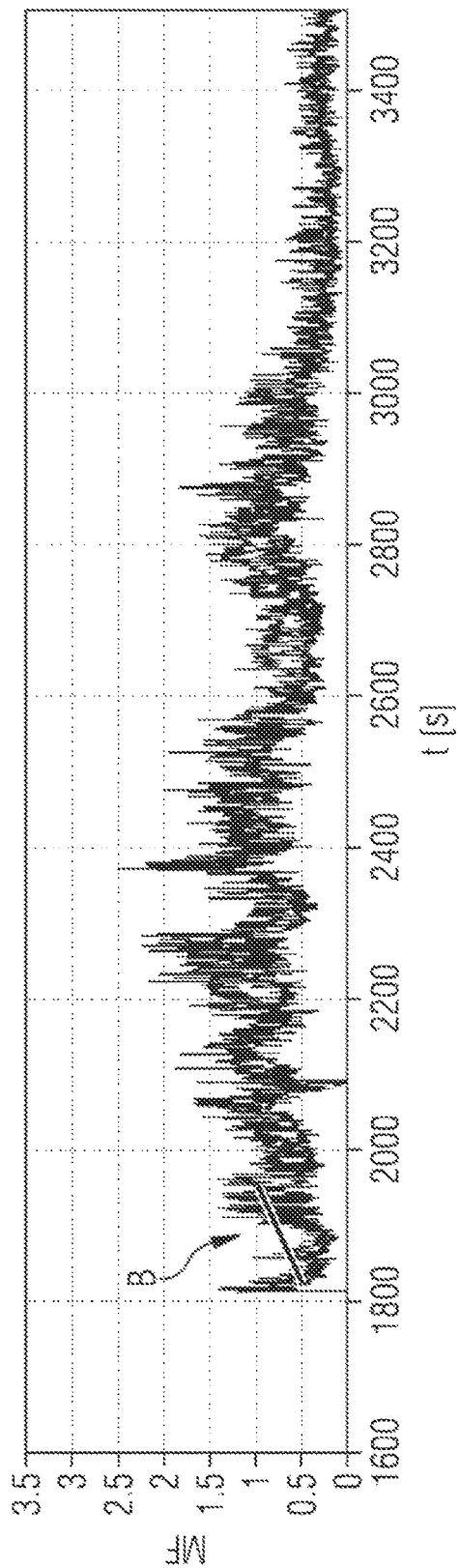
FIG. 3 shows a third exemplary embodiment of an instantaneous flicker curve.

FIGS. 2 and 3 clearly show that the curve and the height of flicker can have very different profiles depending on the scrap metal used and the melting mode of operation. FIGS. 2 and 3 show two different scenarios on an enlarged scale for two melts. While in the first scenario according to FIG. 2, a curve as described in FIG. 1 is shown, a completely different curve of the instantaneous flicker takes place in FIG. 3 as a second scenario. In the second scenario, the scrap metal composition and possibly also the operating parameters were different in comparison to the first scenario in FIG. 2, so that the flicker does not substantially increase either in the drilling phase or in the collapse phase and is very low as a whole.

Scenario 1 shows a steep increase and high flicker values in the drilling phase B. Scenario 2 according to FIG. 3 shows a gentle increase in the drilling phase B with low flicker values.

Figure 4:
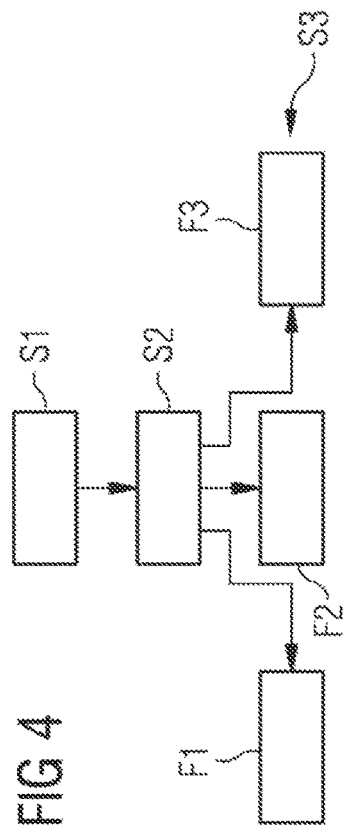
FIG. 4 shows an exemplary embodiment of a method according to the invention.

FIG. 4 shows an exemplary embodiment of a method according to the invention.

It is particularly advantageous to use the items of information from the curve of the instantaneous flicker and the associated state variables and operating variables in particular in the starting phase from approximately 100 to 200 seconds during the melting of each basket K, to predict the future flicker.

According to a first step S1, a knowledge database about the curve of the flicker is prepared for each furnace in dependence on the melting process and steel qualities, in which a sufficient number of typical cases is stored. The following data are stored in this so-called flicker database:

Dimension and slope of the instantaneous flicker in the starting phase in the time range of approximately 100 to 200 seconds and in the further curve, as well as basket number, steel quality, electrical parameters, which can be, for example, voltage, current, transformer step, throttle step, effective power and apparent power, etc., and scrap metal parameters, which can be, for example, the scrap metal quality, the scrap metal volume, the scrap metal weight, etc. With a second step S2, this flicker database is transferred into a classifier, using which a similarity search can be carried out over a suitable feature space, for example, with a so-called "closest neighbor" classifier. For this purpose, the flicker curve most similar to the measured instantaneous flicker values, which can be the dimension and slope of the instantaneous flicker, for example, and the associated state variables and operating variables, is found. This classifier can also operate on a dynamically growing knowledge database and can be implemented as a learning system. The knowledge database can also be stored in a decentralized manner in a so-called "enterprise cloud". Since the data of many different melting furnaces are stored here, the initial learning effort would be reduced. After the most probable flicker curve has been found from the starting phase, the further mode of operation can be dynamically optimized in a third step S3. For this purpose, three cases F1, F2, and F3 can be roughly differentiated. Case F1: the predicted flicker values are significantly less than predefined limiting values. In this case, the mode of operation is trimmed to optimum energy introduction and highest performance. This means, for example, for the electrode regulation, a setting for longer electric arcs and lower currents. Case F2: the predicted flicker values are greater than predefined limiting values. In this case, the mode of operation is adapted for the periods in which high flicker values are expected, as outlined hereafter. As was apparent from FIGS. 1 to 3, the periods having high flicker values occur in particular at the end of the drilling phase, i.e., approximately 100 to 250 seconds after the beginning of melting, for each basket K and in the collapse phase E. The inductance can be increased in these periods by higher throttle steps or by switching in a throttle or coil, which results in more stable electric arcs. The electrode regulation is set for shorter electric arcs having higher currents. Furthermore, targeted periodic movements in the electric arcs could result in flicker reduction especially in the collapse phase E. In addition, parameters can be dynamically changed in a possibly provided SVC. Case 3: the predicted flicker values lie in a border region here. A compromise can now be set between a high melting performance and the flicker reduction in the periods having high flicker values. In particular, the flicker reduction can be executed at the end of a drilling phase B and during a collapse phase E.

The methods proposed here ensure optimum melting performance and can generally keep the flicker values below predefined limiting values. However, there is not absolute certainty in this regard, since the method is based on a prediction and flicker values occurring in future may deviate therefrom. For example, scrap metal collapses are subject to a certain level of randomness.

The present invention uses the finding that the flicker values to be expected may be determined with high probability from suitable state variables and operating variables, which are captured during the first minutes in the melting phase. In this manner, flicker can be effectively reduced and kept under predefined limiting values. The invention is suitable in particular in the case of steel production using electric arc furnaces.

The invention claimed is:

1. A method for reducing flicker in steel production using an electric arc furnace, which comprises the steps of:
    providing a flicker database storing a plurality of curves of flicker;
    measuring a curve of flicker during an initial melting phase of a steel production;
    comparing, via a computer, the curve of flicker during the initial melting phase of the steel production with the plurality of curves of flicker in the flicker database;
    selecting, via the computer, one of the plurality of curves of flicker in the flicker database by performing a similarity search comparing the plurality of curves of flicker in the flicker database with the curve of flicker during the initial melting phase of the steel production;
    in the computer, using the selected one of the plurality of curves of flicker as a predicted curve of flicker; and
    changing an electrode regulation based on a comparison of the predicted curve of flicker with the curve of flicker during the initial melting phase of the steel production.

2. The method according to claim 1, which further comprises measuring and storing in each case a dimension and a slope of the instantaneous flicker.

3. The method according to claim 1, wherein the initial melting phase has in each case a drilling phase and a collapse phase for scrap metal that is introduced in each case by means of a basket, and a measurement and a determination take place in each case during a first 100 to 200 seconds after melting of the introduced scrap metal.

4. The method as claimed in claim 1, wherein if predicted flicker values are less than predefined limiting values, a controller controls the steel production process by performing an electrode regulation.

5. The method according to claim 1, wherein if predicted flicker values are greater than predefined limiting values, a controller controls the steel production process in a manner adapted for flicker reduction during times flicker values are greater than predicted.

6. The method according to claim 5, which further comprises taking into consideration, via the controller, auxiliary information that flicker values which are greater than predicted occur for each basket at an end of a drilling phase and/or during a collapse phase.

7. The method according to claim 5, wherein the control unit increases an inductance of the electric arc furnace by means of higher throttle steps or switching in a throttle during a time that the flicker values are greater than predicted.

8. The method according to claim 5, wherein the controller adjusts electric arcs and currents by an electrode regulation during the times the flicker values are greater than predicted.

9. The method according to claim 5, wherein the control unit applies targeted periodic movements to electric arcs during the times the flicker values are greater than predicted.

10. The method according to claim 5, wherein the control unit changes parameters during the times the flicker values are greater than predicted.

11. The method according to claim 1, wherein when predicted flicker values are adjacent predefined limiting values, a controller controls the steel production process to set a compromise is between a melting performance and flicker reduction.

12. The method according to claim 11, wherein the control unit controls the steel production process in a manner adapted for flicker reduction during a time at an end of a drilling phase for each basket and during a collapse phase.

13. The method according to claim 1, which further comprises storing the plurality of curves of flicker in dependence on variables.

* * * * *